(12) United States Patent
Betancourt et al.

(10) Patent No.: US 12,532,821 B1
(45) Date of Patent: Jan. 27, 2026

(54) ADJUSTABLE DUAL CAPILLARY WICK PLANT IRRIGATION SYSTEM WITH WATER LEVEL MANAGEMENT

(71) Applicants: Omar Perfecto Betancourt, Miami, FL (US); Carlos S Rionda, Sr., Miami, FL (US); Jose Manuel Gutierrez, Hialeah Gardens, FL (US)

(72) Inventors: Omar Perfecto Betancourt, Miami, FL (US); Carlos S Rionda, Sr., Miami, FL (US); Jose Manuel Gutierrez, Hialeah Gardens, FL (US)

( * ) Notice: Subject to any disclaimer, the term of this patent is extended or adjusted under 35 U.S.C. 154(b) by 0 days.

(21) Appl. No.: 19/211,498

(22) Filed: May 19, 2025

(51) Int. Cl.
*A01G 27/06* (2006.01)

(52) U.S. Cl.
CPC .................... *A01G 27/06* (2013.01)

(58) Field of Classification Search
CPC ........ A01G 27/04; A01G 27/06; A01G 27/00; A01G 27/005; A01G 27/006; A01G 27/008; A01G 27/02
See application file for complete search history.

(56) References Cited

U.S. PATENT DOCUMENTS

| | | | | |
|---|---|---|---|---|
| 880,968 | A * | 3/1908 | Bunker | A01G 27/04 47/81 |
| 2,346,029 | A * | 4/1944 | Jennings | A01G 27/04 405/45 |
| 2,491,124 | A * | 12/1949 | Martin | A01G 29/00 405/36 |
| 4,741,125 | A * | 5/1988 | Demorest | A01G 27/06 47/81 |
| 5,329,729 | A * | 7/1994 | Liang | A01G 27/005 47/81 |
| 5,375,371 | A * | 12/1994 | Wells | A01G 27/06 47/84 |
| 5,588,255 | A * | 12/1996 | Johnson | A01G 27/04 47/62 R |
| 11,240,972 | B2 * | 2/2022 | Lee | A01G 9/0302 |
| 2002/0020111 | A1 * | 2/2002 | Rosenberg | A01G 27/006 47/79 |
| 2005/0204624 | A1 * | 9/2005 | Lozano Teruel | A01G 27/04 47/79 |
| 2013/0133257 | A1 * | 5/2013 | Li | A01G 27/06 47/79 |
| 2013/0212939 | A1 * | 8/2013 | Li | A01G 27/005 47/48.5 |

* cited by examiner

*Primary Examiner* — Katelyn T Truong
(74) *Attorney, Agent, or Firm* — Ruben Alcoba, Esq.

(57) ABSTRACT

A plant irrigation system that is placed in a plant container. The plant irrigation system comprises a water reservoir, and a dual capillary wick arrangement. A first, descending wick draws water from the reservoir to a capillary delivery conduit, whose outlet delivers water to a growing medium. The vertical position of this conduit's outlet relative to the reservoir's water level is adjustable, allowing user control of the water delivery rate by altering the hydrostatic head against which the wick operates. A second ascending wick, separate from the first, extends from a lower region of the growing medium upwards, facilitating removal of excess water and enhancing aeration of the growing medium. The system provides sustained, regulated hydration and drainage for plants.

6 Claims, 3 Drawing Sheets

ADJUSTABLE DUAL CAPILLARY WICK PLANT IRRIGATION SYSTEM WITH WATER LEVEL MANAGEMENT

BACKGROUND OF THE INVENTION

Field of the Invention

The present invention relates generally to plant watering devices, and more particularly to an automatic or semi-automatic irrigation system utilizing capillary wicks for controlled water delivery and management in potted plants or similar growing environments.

Description of Related Art

Maintaining optimal moisture levels for potted plants can be challenging, especially when owners are away for extended periods or manage multiple plants. Various automatic watering systems have been developed to address this need.

Simple wick systems are known, where a wick draws water from a reservoir directly into the soil. However, these often lack precise control over the watering rate, potentially leading to over or under-watering depending on the plant's needs, reservoir size, and ambient conditions.

More complex systems, such as those employing drip irrigation, have also been proposed. For example, U.S. Pat. No. 5,511,341 to Payne describes an automatic house plant watering system using a reservoir with an adjustable fill plug to control air inflow, thereby regulating gravity-driven water outflow through user-adjustable valves and tubing to plants. This system relies on air pressure dynamics and valve constrictions rather than direct capillary action modulation for its primary flow control.

U.S. Pat. No. 5,735,635 to Johnston et al. discloses a gravity feed watering system using a manifold connected to a reservoir, detachable dripper devices, and tubing to deliver water droplets. Flow control is achieved via the dripper design, clamps, and control gates at plant sites.

This, like Payne, is a drip irrigation system relying on mechanical flow restriction.

While these systems offer solutions, they may involve complexities in setup, potential for clogging in drip emitters, or may not adequately address issues of soil aeration and excess water removal from the lower regions of the plant pot, which can lead to root rot. There remains a need for a simple, reliable, and adjustable plant irrigation system that utilizes the benefits of capillary action for both water delivery and excess water management, while providing straightforward user control over the irrigation rate.

SUMMARY OF THE INVENTION

The present invention provides an adjustable dual capillary wick plant irrigation system designed to overcome limitations of prior art systems. It is an object of the present invention to provide a plant irrigation system that allows for controlled, sustained water delivery to a plant's growing medium.

It is another object of the present invention to provide a system where the rate of water delivery can be easily adjusted by the user to suit the needs of different plants or environmental conditions. This is achieved by modulating the effective hydrostatic head against which a primary delivery wick operates.

It is a further object of the present invention to incorporate a secondary wicking mechanism to help manage excess water in the lower portion of the growing medium, thereby improving aeration and reducing the risk of root rot.

In one embodiment, the system comprises a water reservoir that is configured to be placed in a plant container that holds a growing medium. A first capillary wick is configured to draw water from the water reservoir. This first wick extends into a capillary delivery conduit, the outlet of which is positioned to deliver water to the growing medium. Critically, the vertical position of this capillary delivery conduit (and thus its outlet) is adjustable relative to the water level in the reservoir. By changing this relative height, the user alters the vertical distance the water must be lifted by capillary action against gravity, thereby controlling the flow rate. A higher lift results in a slower flow rate, and a lower lift (while keeping the outlet above the reservoir water level to primarily rely on capillary action) results in a faster flow rate.

The system further includes a second, independent capillary wick. This second wick is positioned with one end in the lower region of the growing medium and the other end extending towards or at the surface of the growing medium. This second wick serves to draw excess moisture upwards from the bottom of the pot, facilitating its evaporation and improving aeration of the root zone.

The components are designed for simplicity, ease of use, and applicability to various types of plant cultivation, including indoor and outdoor settings. The system aims to provide a balance between effective hydration and prevention of waterlogging.

As an additional benefit, the system provides a unique dual-phase water movement behavior during operation. Initially, water flows downward from the reservoir while simultaneously unused water is drawn upward from the bottom region of the growing medium. Once the reservoir is depleted, the upward capillary movement continues autonomously, thereby extending the irrigation cycle and significantly increasing the self-sufficiency of the system. This allows for extended periods without the need for refilling, depending on plant type, growth stage, and environmental conditions. Users may evaluate moisture adequacy through the tactile temperature of the substrate, which remains cool when sufficiently moist.

Additionally, the present system may be used not only for hydration but also for the delivery of plant nutrients by incorporating soluble fertilizers into the water reservoir. The dual-wick configuration enables gradual and uniform distribution of these nutrients to the growing medium. Furthermore, the system is particularly well-suited for use during the shipment or transport of plants, as it maintains stable moisture levels without requiring active intervention. It may also be advantageously employed in plant nurseries or temporary growing environments where large-scale irrigation infrastructure is unavailable, providing a cost-effective and scalable solution for consistent plant care.

Further objects and advantages of this invention will become apparent from a consideration of the drawings and ensuing description.

BRIEF DESCRIPTION OF THE DRAWINGS

These and other features, aspects, and advantages of the present invention will become better understood with regards to the following description, appended claims, and drawings where:

DETAILED DESCRIPTION OF THE PREFERRED EMBODIMENTS

Figure 1:
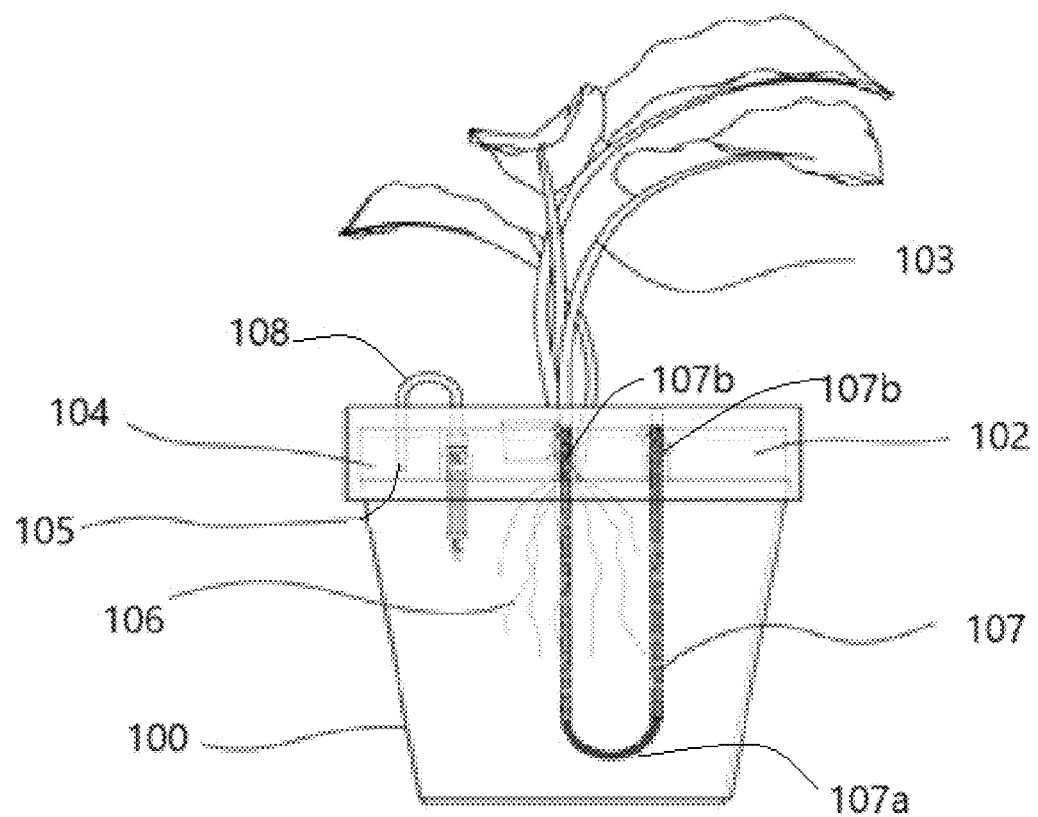
FIG. 1 is a general diagrammatic view of a combined irrigation system according to an embodiment of the present invention, showing a plant in a container with the dual wick system.

Referring now to the drawings, wherein like reference numerals designate identical or corresponding parts throughout the several views, FIG. 1 shows a plant irrigation system embodiment. A plant container 100 is provided, suitable for holding a growing medium 106 in which a plant 103 is cultivated.

Positioned within or adjacent to the plant container 100 is a water reservoir 102. The water reservoir 102 is adapted to hold a supply of water, and a water level 104 indicates the amount of water therein.

Figure 2:
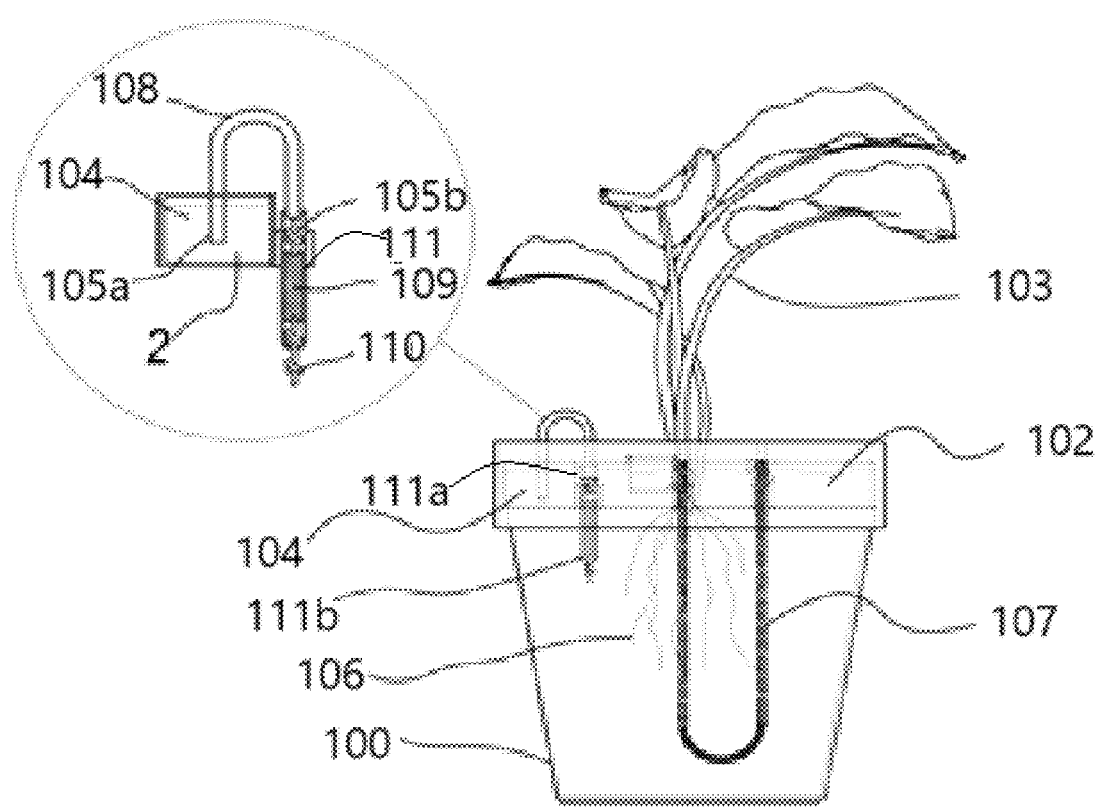
FIG. 2 is a diagrammatic view similar to FIG. 1, with a detailed callout showing components of the water reservoir and the first wick delivery assembly.
Figure 3:
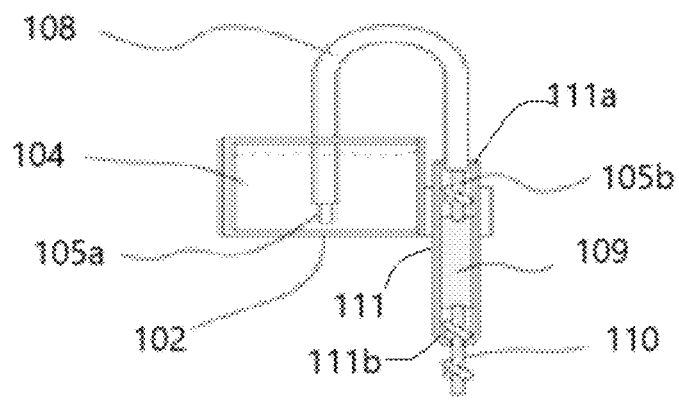
FIG. 3 is an enlarged, detailed diagrammatic view of the water reservoir and first wick delivery assembly components shown in the callout of FIG. 2.
Figure 4:
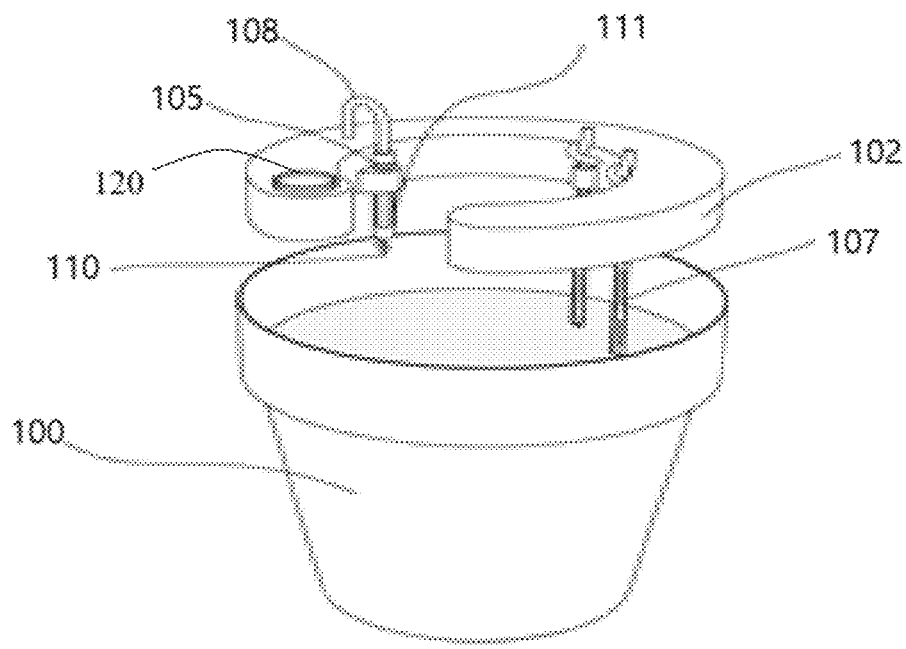
FIG. 4 is an isometric view of an assembly of the system components in a pot with a planted plant.

A first capillary wicking subsystem is provided for delivering water from the water reservoir 102 to the growing medium 106. This first capillary subsystem includes a first capillary wick 105. The first capillary wick 105 has a first end 105a immersed in the supply of water within the water reservoir 102 and a second end 105b extending therefrom. The first capillary wick 105 is preferably sheathed or guided by a flexible protective conduit 108 as it exits the water reservoir 102. The flexible protective conduit 108 may optionally include perforations (not explicitly shown but implied as client's means to prevent siphoning) to act as siphon breaks, ensuring water transport is primarily by capillary action, especially if the outlet of the delivery system were to approach or fall below the water reservoir 102 water level 104. The second end 105b of the first capillary wick 105, along with its protective conduit 108, extends to and enters a capillary delivery conduit 111 (also referred to as "flow regulator tube" or "plastic tube"). As best seen in FIGS. 2, 3, and 4, the capillary delivery conduit 111 is typically a tubular structure having an inlet end 111a for receiving the first capillary wick 105 and an outlet end 111b from which water is discharged. The capillary delivery conduit 111 may contain an internal capillary medium 109 (a substrate filler) which can be the continuation of the first wick 105 or a separate wicking material in contact with it. An optional lower wick segment 110 can be positioned at the outlet 111b end of the capillary delivery conduit 111, or be an extension of the first capillary wick 105 and/or internal capillary medium 109, to directly interface with the growing medium 106. The outlet of the capillary delivery conduit 111 (or the lower wick segment 110 if present) is positioned to deliver water into the growing medium 106.

A key feature of the invention is the adjustability of the water delivery rate. The vertical position of the capillary delivery conduit 111 relative to the water level 104 in the water reservoir 102 can be adjusted by a user. By raising the capillary delivery conduit 111, the vertical distance (hydrostatic lift or head) that water must be drawn by the first capillary wick 105 against gravity increases. This increased gravitational opposition to the capillary forces results in a decreased rate of water flow to the growing medium 106. Conversely, by lowering the capillary delivery conduit 111 (while generally maintaining its outlet above the water level 104 to ensure primary reliance on capillary action), the required vertical lift is reduced, and the rate of water flow increases. This mechanism allows the user to fine-tune the irrigation rate based on the plant's needs, the type of growing medium, and ambient environmental conditions. The water reservoir 102 itself might be placed within the plant container 100 (as suggested by FIG. 1) or adjacent to it, and the capillary delivery conduit 111 would be supported by the growing medium 106 or by the edge of the plant container 100 or the water reservoir 102, allowing for its vertical adjustment.

The system further comprises a second ascending capillary wick 107. This second ascending capillary wick 107 is distinct from the first capillary wick 105 and its associated delivery structures. The second ascending capillary wick 107 has a lower end 107a positioned in a lower region of the growing medium 106 within the plant container 100, where excess water tends to accumulate. An upper end 107b of the second ascending capillary wick 107 extends upwardly, typically towards or to the surface of the growing medium 106, and may be exposed to the air as shown in FIGS. 1 and 4. The second ascending capillary wick 107 functions to draw excess water from the saturated lower part of the growing medium 106 upwards by capillary action. This water can then evaporate from the exposed portion of the wick or from the upper layers of the growing medium, preventing waterlogged conditions, improving soil aeration, and mitigating the risk of root rot. The second ascending capillary wick 107 can be supported by or attached to the exterior of the water reservoir 102, as seen in FIG. 2 and FIG. 4, relative to the water reservoir 102 or simply embedded within the growing medium 106. In FIG. 4 you also see a fill port 120 of the water reservoir 102.

In operation, a user fills the water reservoir 102 with water. The first capillary wick 105 draws water from the water reservoir 102 and transports it through the flexible protective conduit 108 into the capillary delivery conduit 111. The user adjusts the vertical height of the capillary delivery conduit 111 relative to the water level 104 in the water reservoir 102 to achieve the desired irrigation rate. Simultaneously, the second ascending capillary wick 107 works passively to remove any excess water that might accumulate at the bottom of the plant container 100, drawing it upwards for evaporation and enhancing aeration.

The materials for the wicks (105, 107, 110) can be any suitable capillary material, such as synthetic felts, cotton, nylon, or other fibrous materials. The conduits (108, 111) and reservoir (102) can be made from plastics or other water-impermeable materials.

What is claimed is:
1. A plant irrigation system, comprising:
a water reservoir adapted to contain a supply of water, the water reservoir defining a water level therein when containing the supply of water, the water reservoir is configured to be placed in a plant container that is configured to hold a growing medium, the water reservoir has a fill port;
a first capillary wick having a first end disposed in the supply of water within the water reservoir and a second end extending therefrom;
a capillary delivery conduit, the capillary delivery conduit having an inlet and an outlet, the second end of the first capillary wick being operatively connected to the inlet of the capillary delivery conduit such that water drawn by the first capillary wick is directed towards the outlet of the capillary delivery conduit;

an internal capillary medium is contained within the capillary delivery conduit, said internal capillary medium being in communication with the second end of the first capillary wick and extends towards the outlet of said capillary delivery conduit;

a lower wick segment disposed at the outlet of the capillary delivery conduit, the lower wick segment being in capillary communication with the internal capillary medium and configured to interface directly with the growing medium; wherein the capillary delivery conduit is vertically adjustable relative to the water level in the water reservoir, such that a rate of water delivery by the first capillary wick to the growing medium is controllable by a user altering a vertical distance between the water level in the water reservoir and the outlet of the capillary delivery conduit; and a second ascending capillary wick, separate from the first capillary wick, having a lower end disposed in a lower region of the growing medium within the plant container and an upper end extends towards a surface of the growing medium, said upper end of said second ascending capillary wick being exposed to ambient air to facilitate evaporation of the excess water, said second ascending capillary wick configured to draw excess water upwardly from the lower region of the growing medium, wherein the second ascending capillary wick is directly mounted to an exterior part of the water reservoir.

2. The plant irrigation system of claim 1, wherein the first capillary wick is at least partially enclosed by a flexible protective conduit between the water reservoir and the inlet of the capillary delivery conduit.

3. The plant irrigation system of claim 2, wherein the flexible protective conduit includes at least one perforation configured to act as a siphon break.

4. The plant irrigation system of claim 1, wherein the second ascending capillary wick is further configured to enhance aeration of the growing medium.

5. The plant irrigation system of claim 1, wherein the water reservoir is configured to be placed within the plant container.

6. The plant irrigation system of claim 1, wherein the second ascending capillary wick is supported, at least in part, by an external surface of the water reservoir.

* * * * *